United States Patent
Lee

(10) Patent No.: US 7,742,049 B2
(45) Date of Patent: Jun. 22, 2010

(54) METHOD AND APPARATUS FOR DISPLAYING CHARACTERS ON A SCREEN

(75) Inventor: Kyu Tae Lee, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 315 days.

(21) Appl. No.: 10/388,500

(22) Filed: Mar. 17, 2003

(65) Prior Publication Data

US 2005/0259102 A1 Nov. 24, 2005

(30) Foreign Application Priority Data

Mar. 15, 2002 (KR) ...................... 10-2002-0014209

(51) Int. Cl.
| | |
|---|---|
| G06T 11/00 | (2006.01) |
| G11B 19/02 | (2006.01) |
| H04N 5/93 | (2006.01) |
| G09G 5/00 | (2006.01) |
| H04N 5/04 | (2006.01) |
| G06K 15/02 | (2006.01) |
| G06K 9/36 | (2006.01) |

(52) U.S. Cl. .................. 345/467; 345/619; 345/636; 345/471; 345/551; 348/322; 348/447; 348/550; 348/715; 358/1.11; 358/505; 358/463; 358/474; 382/232; 382/305; 382/311

(58) Field of Classification Search .............. 345/467, 345/418, 619, 636, 441, 471, 520, 522, 551, 345/555, 556, 560; 348/497, 305, 317, 322, 348/430.1, 440, 447, 456, 477–479, 543, 348/550, 568, 607, 614, 683, 715; 382/232, 382/276, 290, 292, 305, 309–311; 358/505, 358/500, 2.99, 1.11, 3.26, 533, 462–463, 358/501, 470, 474; 715/200, 240, 255–256
See application file for complete search history.

(56) References Cited

U.S. PATENT DOCUMENTS

| 5,250,934 A | * | 10/1993 | Denber et al. ............... 345/611 |
|---|---|---|---|
| 5,337,408 A | * | 8/1994 | Fung et al. .................... 345/10 |
| 5,586,241 A | * | 12/1996 | Bauermeister et al. ...... 345/467 |
| 5,717,799 A | * | 2/1998 | Robinson ..................... 385/37 |
| 6,392,650 B1 | * | 5/2002 | Morrish et al. .............. 345/467 |
| 6,504,543 B1 | * | 1/2003 | Okamoto et al. ............ 345/441 |
| 2006/0221200 A1 | * | 10/2006 | Kusaka et al. ............ 348/222.1 |

FOREIGN PATENT DOCUMENTS

| JP | 54-054532 | 4/1979 |
|---|---|---|
| JP | 55-088134 | 7/1980 |
| JP | 06-245158 A | 9/1994 |
| JP | 06-245158 A | 9/1994 |
| KR | 10-1999-0073917 | 8/2005 |

* cited by examiner

*Primary Examiner*—Wesner Sajous
(74) *Attorney, Agent, or Firm*—Birch, Stewart, Kolasch & Birch, LLP

(57) ABSTRACT

A method and apparatus for displaying characters on a TV screen in an electronic appliance such as a DVD player is disclosed. Vertically compressed character fonts are stored. When it is requested to display a character, the stored character font is read and displayed in a video field and then the character font is displayed again in the next video field, whereby flickering can be effectively eliminated with a reduced-size memory for storing fonts data.

9 Claims, 3 Drawing Sheets

*Conventional Font*

*Present Font*

METHOD AND APPARATUS FOR DISPLAYING CHARACTERS ON A SCREEN

BACKGROUND OF THE INVENTION

1. Field of the Invention

The present invention relates generally to a method and apparatus for displaying characters on a screen and, more particularly, but not by way of limitation, to a method and apparatus for outputting OSD (on-screen display) characters on a TV screen in an electronic appliance such as a DVD player.

2. Description of the Related Art

Digital electronic appliances such as DVD players need fonts data to provide OSD (on-screen display) menus or additional services such as an electronic dictionary. The fonts data are commonly stored in a non-volatile memory included in the electronic appliances.

When it is requested to display some characters on a TV screen, the font data corresponding to the characters are read from the non-volatile memory and converted into video signals, whereby the characters are displayed on the screen.

A user may execute a desired function by selecting an item from the displayed OSD menu screen or requests a dictionary meaning of a word by selecting a character string displayed on the OSD screen.

To implement a function of an electronic dictionary as well as a simple OSD menu in an electronic appliance, fonts data for the characters to be displayed should be prepared. Fonts data are usually stored in a non-volatile memory device of a large size, which increases the manufacturing cost.

SUMMARY OF THE INVENTION

It is an object of the invention to provide a method and apparatus for displaying characters on a screen with reduced-sized fonts data wherein character fonts are compressed to be stored in a relatively small-sized non-volatile memory.

A method for displaying a character in accordance with the present invention is characterized in that it comprises the steps of: reading a character font from a storage means; displaying the read character font in a video field; and displaying the read character font in the next video field once again.

Another method for displaying a character in accordance with the present invention is characterized in that it comprises the steps of: reading a character font from a storage means; displaying a bit line of the read character font in a scan line; and displaying the bit line of the read character font in the next scan line once again.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENT

In order that the invention may be fully understood, preferred embodiments thereof will now be described with reference to the accompanying drawings.

A method for displaying characters on a screen in accordance with an embodiment of the invention may be applicable to multi-functional digital electronic appliances such as a DVD player.

Figure 1:
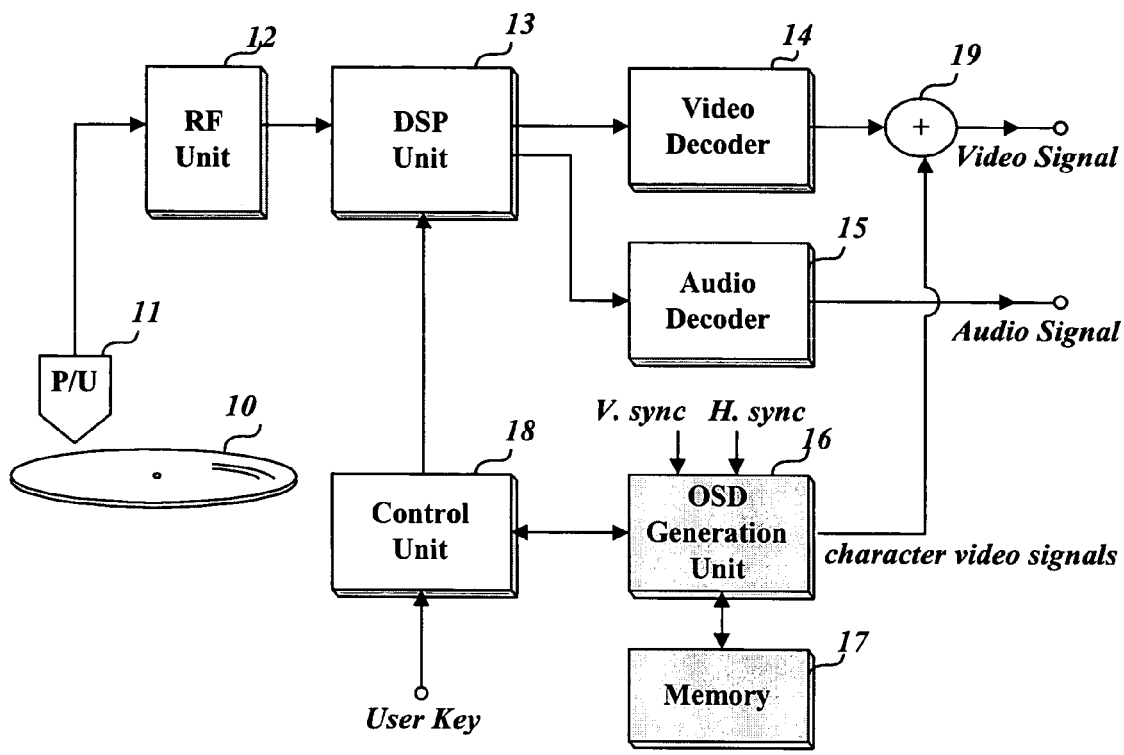
FIG. 1 depicts a block diagram of a DVD player embodying the present invention.

FIG. 1 depicts a block diagram of a DVD player in which the present invention may be advantageously embodied. The DVD player comprises an optical pickup 11 for reading video and audio data recorded on an optical disk 10, an RF unit 12 for converting the RF signal received from the optical pickup 11 to binary signals, a digital signal processing unit 13 for retrieving original digital data from the binary signals, a video decoder 14 and an audio decoder 15 for decoding the retrieved digital data to produce video and audio signals, a non-volatile memory 17 for storing fonts data for characters, an OSD generation unit 16 for generating OSD using the fonts data, a video mixer 19 for mixing the video signals generated by the video decoder 14 and the OSD generated by the OSD generation unit 16, and a control unit 18 for controlling the operation of each component.

The optical pickup 11 produces RF signals by reading signals recorded on the optical disk 10. The RF unit 12 produces binary signals after amplifying and shaping the RF signals.

The digital signal processing unit 13 processes the binary signals received from the RF unit 12 to retrieve original digital data. The video decoder 14 decodes the compressed video data of the retrieved digital data to output video signals. Likewise, the audio decoder 15 decodes the compressed audio data of the retrieved digital data to output audio signals. A TV, which is connected to the DVD player and receives the video and audio signals, reproduces video and audio signals through the screen and speakers.

Figure 2A:
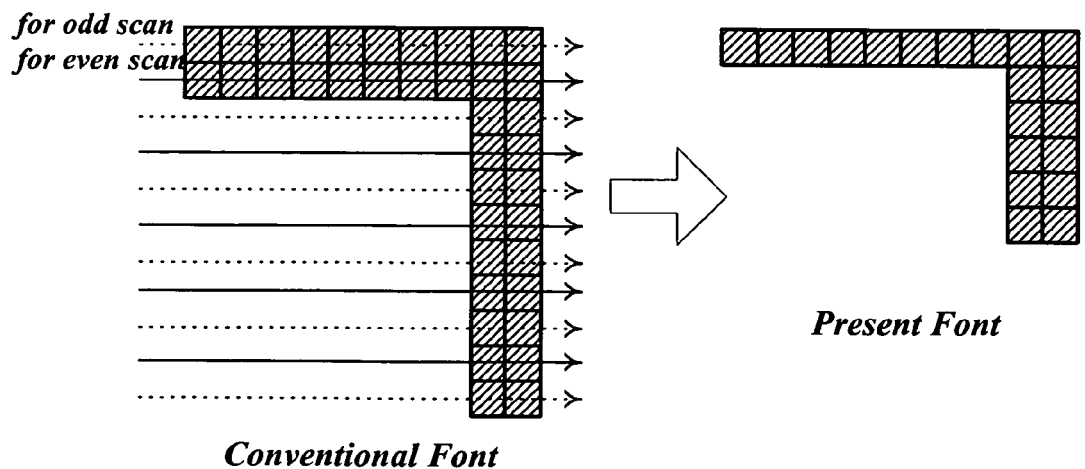
FIG. 2*a* illustrates an exemplary character font in accordance with an embodiment of the invention.

The non-volatile memory 17 stores the fonts data for characters to be displayed. The fonts data represent a horizontal line of a character using a single line. As shown in FIG. 2*a*, conventional fonts data represent a horizontal line of a character using two lines with a view for preventing flicker effects. Compared to the conventional fonts, therefore, the fonts in accordance with an embodiment of the invention is half in size and can be stored in a non-volatile memory with half the capacity.

In case of Korean character fonts, the space savings of the non-volatile memory 17 can be even greater if composition-type Korean fonts are employed instead of completion-type Korean fonts.

When characters inputted by a user is to be displayed on the screen, the control unit 18 reads the fonts stored in the non-volatile memory 17 and converts the fonts into video signals through the OSD generation unit 16, thereby displaying the characters on the screen.

In an interlaced scan, a horizontal line of a character should be displayed in both even and odd fields to prevent flicker effects. With the fonts stored in the non-volatile memory 17, which represent a horizontal line of a character using a single bit line, flicker effects can be avoided with the method to be explained below.

Figure 2B:
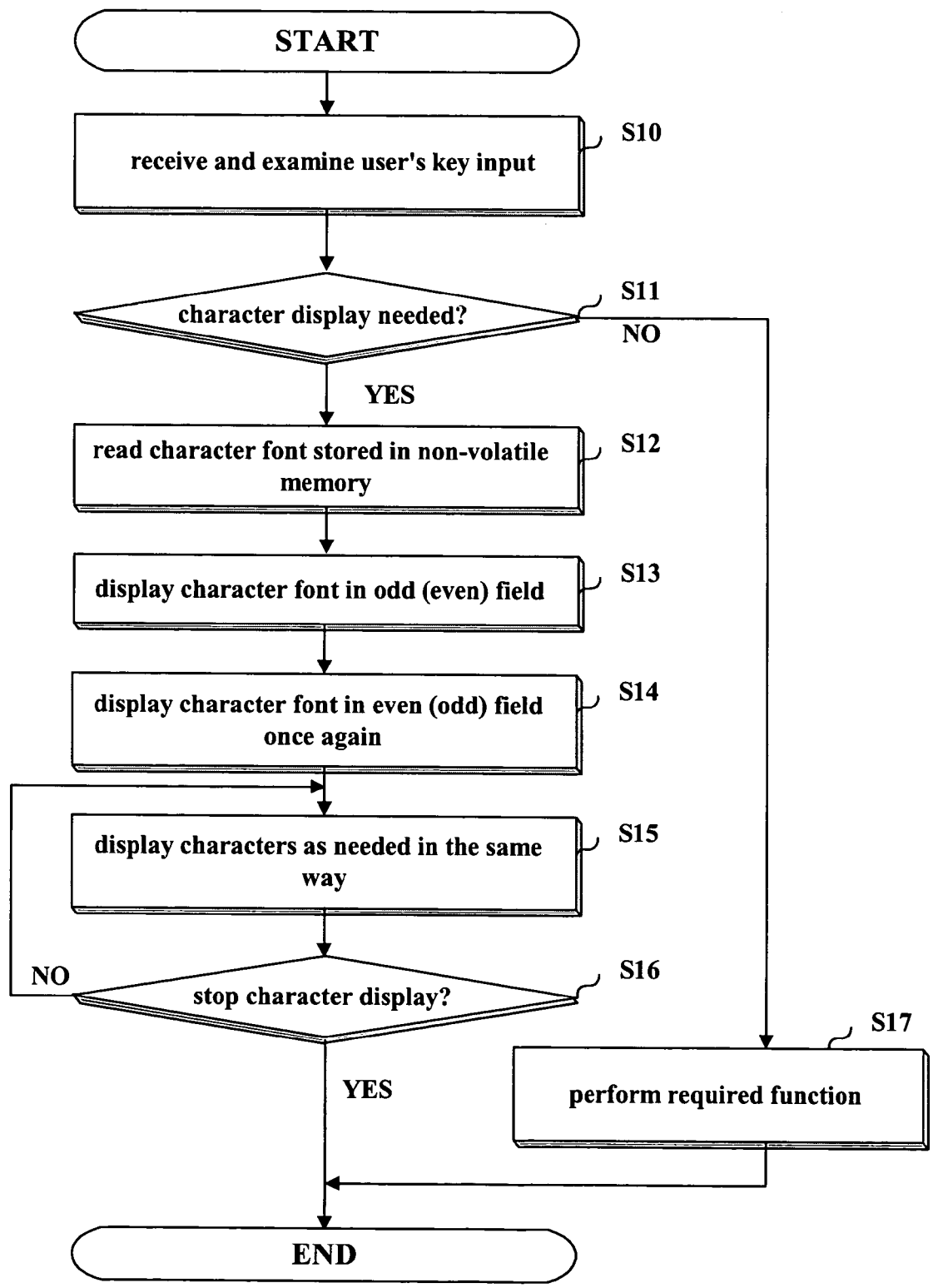
FIG. 2*b* shows a flow diagram for displaying a character in accordance with an embodiment of the invention.

FIG. 2*b* shows a flow diagram of the method for displaying characters in accordance with the invention.

The control unit 18 receives a user's key input and examines whether a request that requires the display of characters such as OSD display or electronic dictionary is received (S10).

For example, suppose that a request for displaying OSD is received (S11). Then the control unit 18 reads requested fonts stored in the non-volatile memory 17 and converts the fonts into video signals through the OSD generation unit 16, thereby displaying the characters on the screen.

To explain the process in more detail, the OSD generation unit 16 reads necessary fonts data (S12) and outputs each video line in synchronization with horizontal sync signals (S13). And then the OSD generation unit 16 repeats the process once again after a vertical sync signal occurs (S14). As a result, the data for a character is displayed in two adjacent scan lines of both even and odd fields within one frame, and thereby flickering does not happen.

The OSD for the characters generated by the OSD generation unit 16 is mixed with the picture video signal generated by the video decoder 14 by the video mixer 19 and applied to a connected TV.

Figure 3:
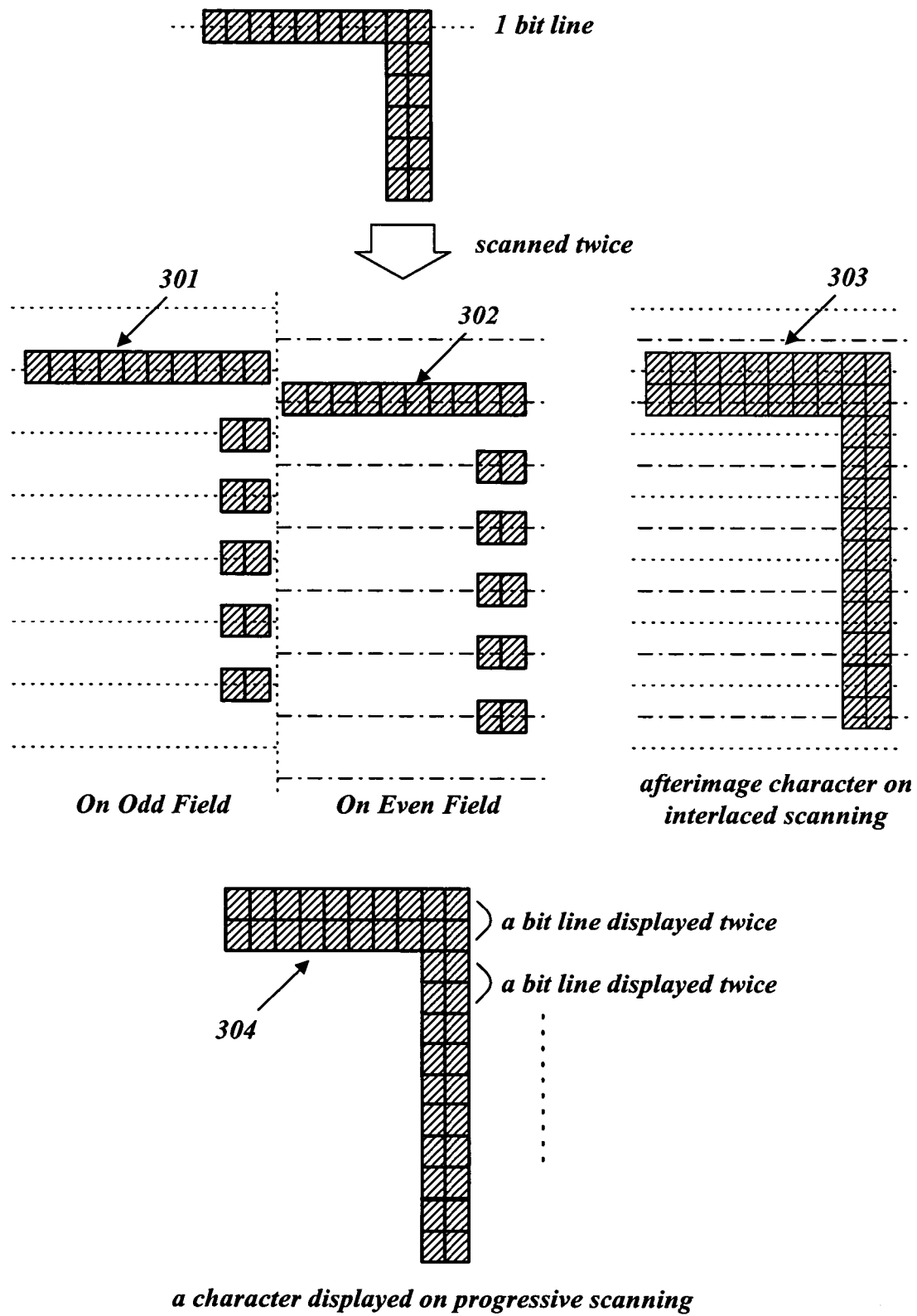
FIG. 3 illustrates a character to be displayed on a screen in accordance with an embodiment of the invention.

FIG. 3 shows an example of displaying a Korean character '기' by the above method.

The horizontal line of '기' is displayed in the nth line (301) of an odd field and displayed again in the (n+1)th line (302) of an even field. Though the font data for the character has a single bit line corresponding to a horizontal line of the character, the horizontal line is displayed in both odd and even fields (303), whereby flickering is prevented.

In a non-interlaced display scheme, each bit line of font data is displayed repeatedly in two successive scan lines like 304 of FIG. 3, whereby the vertically compressed font is displayed normally on the screen.

After repeatedly displaying characters as many as required (S15), the control unit 18 stops the generation of OSD image by controlling the OSD generation unit 16 if a request for a function that does not need display of characters is received (S16).

The method for displaying characters on a screen in accordance with the invention saves memory space by reducing the memory space for needed storing fonts data.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method of displaying characters on a display, comprising:
   receiving and examining a display user's input request to display characters on a screen;
   if a character is to be displayed, reading font data for the character from a non-volatile memory, wherein the font data represent a horizontal line of a character using a single bit line;
   first displaying a font for the character in a single bit line corresponding to a horizontal line of the character in nth line of one field in one frame, wherein n is a natural number, or one scan line in one frame;
   redisplaying the same font for the character in a single bit line corresponding to the horizontal line of the character in (n+1)th line of a successive field of the one field or a successive scan line of the one scan line in one frame so that flickering is prevented; and
   displaying additional display characters in response to the request.

2. The method of claim 1, wherein the font is a vertically compressed font.

3. The method of claim 1, further comprising providing an interlaced scan image on the display.

4. The method of claim 1, further comprising providing a progressively scanned image on the display.

5. A display apparatus, comprising:
   a control unit configured to receive and examine a display user's input request to display characters on a screen, and to read font data for the character from a non-volatile memory if a character is to be displayed, wherein the font data represent a horizontal line of a character using a single bit line; and
   a display unit configured to be controlled by the control unit to first display a font for the character in a single bit line corresponding to a horizontal line of the character in nth line of one field in one frame, where n is a natural number, or one scan line in one frame; to redisplay the same font for the character in a single bit line corresponding to the horizontal line of the character in (n+1)th line of a successive field of the one field or a successive scan line of the one scan line in one frame so that flickering is prevented; and to display additional display characters in response to the request.

6. The display apparatus of claim 5, wherein the font is a vertically compressed font, and the display unit is further configured to display the vertically compressed font normally.

7. The apparatus of claim 5, wherein the display unit is further configured to display an interlace scan image.

8. The apparatus of claim 5, wherein the display unit is further configured to display a progressively scanned image.

9. A method of displaying a character which normally has font data representing a horizontal line of the character using a single bit line by using font data which represent a horizontal line of the character using two bit lines, comprising:
   storing the font data which represent a horizontal line of the character using two bit lines in a non-volatile memory of approximately half the size of a non-volatile memory needed to store font data representing a horizontal line of the character using a single bit line;
   receiving and examining a display user's input request to display a character on a screen;
   if a character is to be displayed, reading the font data for the character which represent a horizontal line of the character using two bit lines from the non-volatile memory, the font data stored in the non-volatile memory being vertically compressed;
   first displaying a font for the character in a single bit line corresponding to a horizontal line of the character in one of adjacent odd and even display raster fields;
   redisplaying the same font for the character in a single bit line corresponding to the horizontal line of the character in the other of the adjacent odd and even display raster fields; and
   displaying additional display characters in response to the request.

* * * * *